United States Patent [19]

Meier et al.

[11] 4,348,350
[45] Sep. 7, 1982

[54] ULTRA-DRAWING CRYSTALLINE POLYMERS UNDER HIGH PRESSURE

[75] Inventors: Dale J. Meier, Midland, Mich.; Leszek Jarecki, Warsaw, Poland

[73] Assignee: Michigan Molecular Institute, Midland, Mich.

[21] Appl. No.: 191,322

[22] Filed: Sep. 26, 1980

[51] Int. Cl.³ .............................................. B29C 23/00
[52] U.S. Cl. ..................................... 264/570; 264/291
[58] Field of Search ................. 264/176 F, 210.3, 570, 264/40.3, 320, 291

[56] References Cited

U.S. PATENT DOCUMENTS

| | | | |
|---|---|---|---|
| 3,007,765 | 11/1961 | Ruyter et al. | 264/570 |
| 3,507,941 | 4/1970 | Kies et al. | 264/570 |
| 3,527,851 | 9/1970 | Bulgin | 264/40.3 |
| 3,707,593 | 12/1972 | Fukada et al. | 264/289.6 |
| 3,711,586 | 1/1973 | Muraoka | 264/340 |
| 3,733,383 | 5/1973 | Bunney et al. | 264/570 |
| 3,767,757 | 10/1973 | Vroom et al. | 264/570 |
| 4,163,770 | 8/1979 | Porosoff | 264/210.3 |

FOREIGN PATENT DOCUMENTS 47-49445 12/1972 Japan .................... 264/176 Z
51-1566 1/1976 Japan ........................ 264/570

OTHER PUBLICATIONS

"Ultrahigh Modulus PE. II", Jarecki et al., J. of Polym. Sci., Polym. Phys. Ed., vol. 17, 1611–1621 (1979).
"Ultrahigh Modulus PE I", Jarecki et al., Polymer, vol. 20, 1078–1082, Sep. 1979.

*Primary Examiner*—Jay H. Woo
*Attorney, Agent, or Firm*—William Miller Yates

[57] ABSTRACT

A solid crystalline organic polymer is made into a filament, rod, or film by ultra-drawing it at a temperature within 70° C. of but below its melting point at the operating pressure while subjecting the polymer during and immediately after drawing to a hydrostatic pressure of at least about 500 atmospheres applied by a fluid medium inert to the polymer. High-density polyethylene and isotactic propylene are preferred polymers. A draw ratio of at least 20:1, and as high as 60:1, may be used. Pressure may be up to 2500 atmospheres or more. The rate of drawing for polyethylene is above 500 percent per minute. The ultra-drawn products are transparent, essentially free of internal voids, and exhibit very high tensile moduli of elasticity, up to 65 to 70 Giga-Pascals in the case of polyethylene.

10 Claims, 2 Drawing Figures

ULTRA-DRAWING CRYSTALLINE POLYMERS UNDER HIGH PRESSURE

BACKGROUND OF THE INVENTION

1. Field of the Invention

High-modulus filaments and rods are produced from crystalline organic polymers by a process of ultra-drawing under high hydrostatic pressure.

2. Description of the Prior Art

Important physical properties of crystalline organic polymers can be greatly improved by mechanically working the polymers to cause alignment of the chain macromolecules. For instance, high-density polyethylene, when formed into filaments highly oriented along the fiber axis, develops a tensile modulus of elasticity (Young's modulus) 70- to 100-fold greater than that exhibited in the isotropic solid state. The modulus at room temperature exceeds 50 GPa (GigaPascals) and may reach 100 GPa. The latter is close to one-third the theoretical limit for a carbon-to-carbon molecular chain and on a weight-for-weight basis exceeds that even of drawn steel wire.

Such filaments have been produced by growing them from dilute solution or by melt or solid-state extrusion through a capillary. These methods are of interest only in laboratory research. Capillary extrusion, for instance, is very slow, making only a few centimeters of filament per hour.

Another known procedure of making strong filaments is that termed "ultra-drawing". In this, a solid body of the polymer, usually somewhat elongated, is stretched or drawn to extreme degree. The draw ratio (length after drawing/length before) should be at least 20, preferably 30 or more, in the case of polyethylene. Such ultra-drawing does make product of greatly increased modulus. However, the filaments produced by ultra-drawing as heretofore conducted have a high content of internal voids, often exceeding 20 percent by volume. The occurrence of such voids renders the product opaque and prevents attainment of the full increase in modulus and other desirable properties of which the polymer is capable.

Further discussion of these factors, with bibliography, appears in articles by the present applicants, Polymer 20, 1078 (1979) and J. Poly. Sci., Polym. Phys. Ed. 17, 1611 (1979).

SUMMARY OF THE INVENTION

The present invention has as an object to provide an improved process for ultra-drawing crystalline organic polymers which minimizes or eliminates the formation of voids in the drawn product. A related object is to provide a process the product of which is transparent and exhibits to exceptional degree the high modulus, tensile strength, density, and other desirable properties of which a given polymer is capable. A further object is to provide an ultra-drawing process adaptable to industrial scale-up to produce polymer filaments, rods, and films with desirable properties not previously obtainable in commercial material, all at practical production rates.

These objects are realized in the invention by ultra-drawing a solid crystalline organic polymer at a temperature within 70° C. of but below its melting point at the operating pressure while subjecting the polymer during and immediately after drawing to a hydrostatic pressure of at least about 500 atmospheres applied by a fluid medium inert to the polymer.

Under the extreme pressure and at controlled temperature, ultra-drawing proceeds smoothly and rapidly and the resulting product is transparent, essentially free of voids, and extremely strong. Elongation of 30- to 60-fold may be attained at a commercial rate of drawing without breaking of the drawn filament.

BRIEF DESCRIPTION OF THE DRAWINGS

The invention may be explained in part by referring to the accompanying drawings, in which.

DETAILED DESCRIPTION OF THE INVENTION

1. Apparatus

Figure 1:
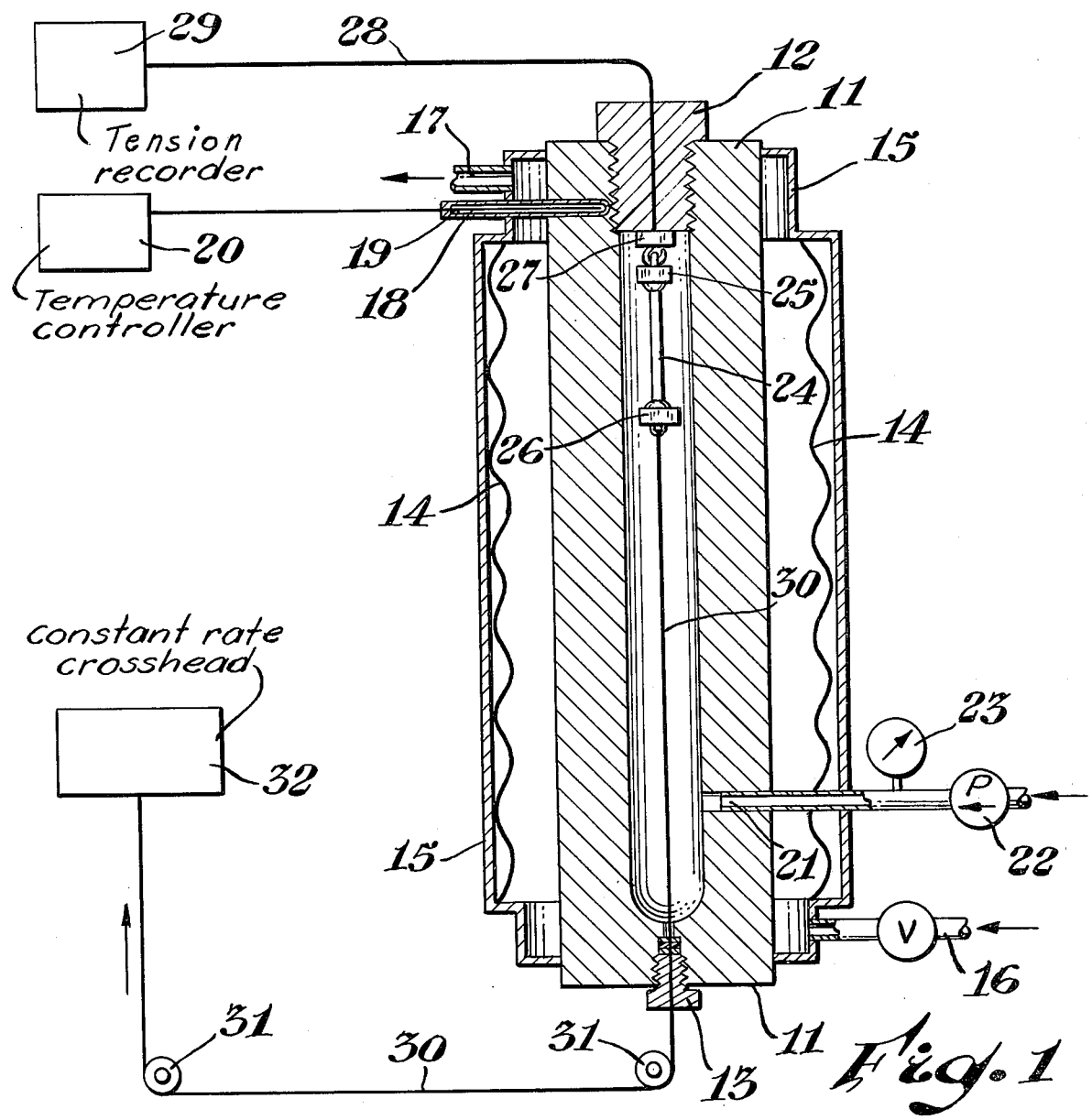
FIG. 1 is a schematic cross-sectional view of a laboratory-scale pressure vessel and associated apparatus for ultra-drawing crystalline polymer under high hydrostatic pressure at controlled temperature.
Figure 2:
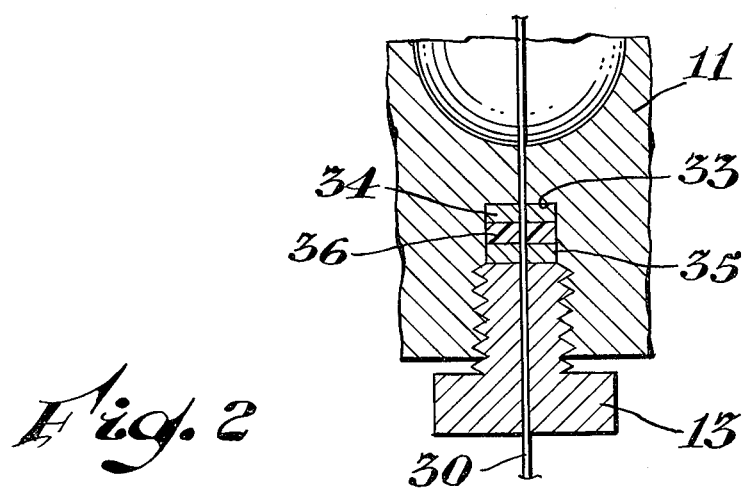
FIG. 2 is an enlargement of the lower portion of the pressure vessel of FIG. 1, showing the details of the seal.

According to one embodiment of the invention, as shown in FIGS. 1 and 2, ultra-drawing is carried out in a thick-walled steel elongated cylindrical vessel 11 designed to withstand internal pressure of several thousand atmospheres. Upper and lower plugs 12 and 13 are threaded axially into the vessel at opposite ends as removable closures. For temperature control, the vessel is surrounded by an electric heating coil 14 and by a cooling jacket 15 through which air or water may be circulated from an inlet 16 to an outlet 17. A thermocouple 18 fitting into a well 19 at the top of the vessel leads to a recorder-controller 20 connected to regulate heating and cooling. Hydrostatic pressure is developed within the vessel by hydraulic fluid entering through an inlet port 21 under the force of an extreme-pressure pump 22. A gauge 23 indicates the working pressure and may be instrumented to control it.

The crystalline polymer to be ultra-drawn is introduced in the bulk or solid state into the pressure vessel in the form of a flat dumbbell-shaped sample 24 and is gripped firmly between upper and lower bronze clamps 25 and 26. The upper clamp hangs on a tension-measuring transducer 27 which is secured to the upper plug 12 and is connected by a lead-wire 28 sealed through the plug to a tension-recorder 29. The lower clamp 26 may be pulled downwardly the length of the vessel by tension from a stainless steel wire 30. This latter runs axially out the bottom of the vessel and over pulleys 31 to the crosshead of a motor-driven constant-rate tensile tester 32 (shown only diagrammatically). As it leaves the vessel, the wire extends through a leak-tight seal shown in detail in FIG. 2.

The seal elements fit into a cylindrical recess 33 in the vessel 11. They include an inside stainless steel flat washer 34 and an outside flat bronze washer 35, each being a round disk with a central hole larger than the wire 30. Between them is a cylindrical plug 36 molded of yieldable polytetrafluoroethylene (Teflon) which acts as the seal proper. This plug has a central hole sized to pass the wire 30 in a tight sliding fit. In service, the seal elements are compressed together by tightening the threaded plug 13 sufficiently to crush the seal 36 against the wire in slidable leak-tight relation.

In making ultra-drawn filament using the apparatus of FIGS. 1 and 2, dumbbell-shaped samples 24 are cut from a compression-molded isotropic sheet or plate of the crystalline organic polymer, e.g. high density polyethylene. One of the samples is placed in the pressure vessel 11 and is gripped between the clamps 25 and 26. The vessel is then filled with hydraulic fluid, such as glycerol, and the end plugs 12 and 13 are tightened. The controller 20 is set to maintain an operating temperature, e.g. 100° C. When temperature has equalized throughout, the pump 22 is actuated with its controller 23 set to produce and maintain a desired operating pressure in the vessel, e.g. 1000 atmospheres. The tensile crosshead 32 is then set in motion at a predetermined speed to pull the wire 30 out of the vessel at a constant linear rate. The lower clamp 26 is thus drawn downward, stretching or drawing the sample 24. (In FIG. 1 the sample is shown part way through the "pull".) Operation is continued until the desired degree of ultra-drawing has been achieved, such as a draw ratio of 30:1, i.e. 30-fold or 3000 percent elongation. The pressure is then relieved and the ultra-drawn filament removed for testing or use.

For purpose of explanation, FIG. 1 shows only a single filament being drawn. However, it will be appreciated that in practice a number of filaments can be made at the same time by securing several pieces of polymer between each pair of draw clamps and by equipping the vessel with a number of pairs of clamps. In each such case, it will be appreciated, the undrawn polymer body and the newly-drawn filament are within a single hydraulic pressure chamber.

Alternatively, ultra-drawing may be carried out on a larger scale in a pressure chamber in which are fitted two power-driven rolls capable of being operated at different rates. Crystalline polymer in the form of essentially isotropic filament or film is first wound on the slower or delivery roll. Its free end is then led to the second or take-up roll. Hydraulic pressure is applied and the second roll is run at a speed sufficiently faster than that of the delivery roll to stretch the filament as it travels to a degree sufficient to achieve the intended draw ratio. If desired, one or both of the rolls may be operated outside the pressure chamber, only provided that the filament or film enters and leaves through adequate seals and the stretching of the moving material takes place within the chamber under the high hydrostatic pressure and at the selected temperature.

In another alternative, the filament or film to be drawn may be produced by forcing the polymer through a filament-or-film-forming die, e.g. by means of a screw extruder, which discharges into the high-pressure drawing chamber. The filament or film as it enters is immediately subjected to ultra-drawing at the established pressure and temperature by the stretching action of a take-up roll in or beyond the chamber run at a linear speed many-fold that at which the filament or film is formed.

2. Process considerations.

The process of the invention has proven especially effective in making transparent, void-free, ultrahigh modulus filament and rod from crystalline lower olefinic hydrocarbon polymers, particularly high-density polyethylene (density above 0.95) and isotactic polypropylene. However, the process appears to be useful in making high-modulus filament from any crystalline organic polymer having a crystalline melting point at atmospheric pressure in the range of 50° to 320° C., best being polymers melting between 100° and 200° C. (Crystalline polyethylene melts about 140°; isotactic polypropylene at about 170° to 180°.) The term "crystalline" as used herein (and in the art generally) does not imply that a polymer has 100 percent crystallinity. It means only that the polymer when subjected to X-ray diffraction study exhibits a distinctly crystalline pattern, in contrast to amorphous polymer. Polymers of the character here included are sometimes called "semicrystalline". High density polyethylene can show about 80 percent crystallinity, while isotactic polypropylene generally has around 50 to 60 percent. It appears to be mainly organic polymers with crystalline content which will undergo orientation on mechanical working to an extent sufficient to be capable of being ultra-drawn without breaking and which can be restrained from void formation during ultra-drawing by applying high hydrostatic pressure.

In the invention, the effective temperature for ultra-drawing is related to the crystalline melting point of the polymer. It should generally be within 70° C. of the melting point. This fact, of course, necessitates operating at temperatures elevated well above room temperature for most crystalline polymers. Somewhat higher temperatures, within 60° C. of the melting point, and better within 40° or 50°, permit forming filament of especially high modulus, allow higher drawing rates, and achieve effective operation at somewhat lower hydrostatic pressures. Still higher temperatures, approaching the melting point at the operating pressure, also may be used in the invention, although as the melting point is approached the degree of improvement due to ultra-drawing under pressure may become less. It should be understood that acceptable operating temperatures may actually exceed the melting point of the polymer at atmospheric pressure, since the melting point of the polymer increases with increasing pressure. In the case of polyethylene, the increase is about 20° C. per 1000 atmospheres.

The operating pressure required to obtain the advantages of the invention is in general at least about 500 atmospheres (0.5 kilobar). With some crystalline polymers, especially some grades of polyethylene, higher pressures, from 1000 to 2500 atmospheres or more, further improve the modulus of the ultra-drawn filament. For any given polymer, the optimum pressure is somewhat related to the operating temperature, with lower pressure above 500 atmospheres sufficing when the temperature nears the melting point of the polymer. Draw ratio and rate of drawing also modestly affect the optimum pressure and temperature. There is also some variation between different grades of the same basic polymer, presumably because of differences in average molecular weight and in molecular weight distribution. In practice, for any given lot of polymer, the optimum conditions, within the ranges of the invention, are chosen empirically by testing. For high-density crystalline polyethylene, maximum modulus and minimum void content seem to be achieved at 1500 to 2000 atmospheres at 70° to 80° C. and at about 500 atmospheres at about 100° to 110° C.

The hydrostatic pressure may be applied by any convenient fluid, usually a liquid, which is chemically inert to the polymer being ultra-drawn and to the apparatus and which remains fluid at operating pressure and temperature. For polyethylene and polypropylene, commercial glycerol has proven satisfactory, showing no tendency to leak through the seal shown in FIG. 2 at pressures up to 2000 atmospheres. Gases or other liquids with limited solubility in the polymer, e.g. ethylene glycol, may also be used.

In producing ultra-high modulus filaments and rods, a draw-ratio of at least 20 is required for crystalline polyethylene and most other organic polymers. For polypropylene, it is at least 13, better 18 to 20 or more. Above this figure, still higher modulus and other desirable properties can be realized as draw ratios are increased still further, up to the maximum the polymer will tolerate under operating conditions without breaking. For high-density polyethylene, draw ratios above 30 may be obtained. This degree of extension, more than 3000 percent stretch, is in sharp contrast to that of isotropic bulk polyethylene, which can be stretched at room temperature and pressure at most to draw ratios less than 10.

The rate of drawing should preferably approach the maximum the polymer will accept without breaking. This rate is related to the rate of internal relaxation of strains imposed on molecular chains in the polymer during stretching and depends somewhat on the identity of the polymer. For crystalline polyethylene, draw rates above 500 percent per minute, i.e. 5 cm. per minute per cm. of initial length, are used, with up to 1500 percent or more often being feasible.

The physical size of the polymer body undergoing ultra-drawing does not appear to be critical. The invention may be applied in making both fine filament, small rod, and film, depending on the length and cross-sectional area of the initial body.

Crystalline polymer ultra-drawn according to the invention is effectively transparent. As such it is readily distinguishable visually from the same polymer ultra-drawn at atmospheric pressure. It also has a very low voids content, well under 8 percent, usually with no detectable voids. It also exhibits outstandingly high tensile modulus of elasticity. In the case of polyethylene at a draw ratio of 35, the modulus is about 65 to 70 GPa. For polypropylene at a draw ratio of 22, the modulus is about 15 GPa. These values are typically 25 or more percent higher than those of the same polymer ultra-drawn at atmospheric pressure at the same draw ratio. The latter is also opaque and has up to 25 percent voids. Ultra-drawn polyethylene made according to the invention also has a melting point as much as 7° C. above that of isotropic polyethylene.

Filaments ultra-drawn at high pressure have a further advantage over those ultra-drawn at atmospheric pressure in that they do not ordinarily fibrillate unless they are intentionally broken. They find use per se as extremely strong monofilament. They may also be twisted or braided together to form strong thread, yarn, or cord, and may be woven into fabric. They also may be chopped into short lengths to serve as reinforcing filler for molded and reinforced plastics, e.g. in the manner of glass fibers. Rods according to the invention are useful as stiffeners and reinforcing, as in concrete.

Operation at high pressure has the further advantage that ultra-drawn filament of outstanding physical properties can be made from a far wider range of grades of a given polymer and with much less criticality of choice of operating temperature, draw ratio, and draw rate than is possible at atmospheric pressure.

3. Example

In a series of tests, filaments were made using the apparatus of FIGS. 1 and 2. Polymers used were three grades of high-density polyethylene having broad molecular weight distributions and two grades of polypropylene, as identified in the accompanying Table. Each polymer was compression-molded into film 0.08 cm. thick and cooled slowly to ambient temperature. (In the case of the Dow Chemical polyethylene grade LP 51.1, the density of the isotropic film was measured as 0.9618 (flotation-tested in a density-gradient column) and the melting point at atmospheric pressure was 133.5° C. (Perkin-Elmer 1B DSC apparatus).) Dumbbell-shaped test samples were cut from each film with a gauge length of 1.0 cm. and a width of 0.5 cm., and were marked in ink with cross-lines 1.0 mm. apart (for measurement purposes).

Each sample was placed in the apparatus and secured between the clamps initially 1.0 cm. apart. Each was ultra-drawn by pulling on the lower clamp (using an Instron Tensile Tester) at a fixed speed of 5 cm. per minute. Runs were made at various constant drawing temperatures in the range from 74° to 125° C. and at various draw ratios (measured by noting the distances between the ink lines on the final ultra-drawn filament).

In each set of runs, hydrostatic pressure was applied with glycerol as the fluid at values as given in the Table. In a comparative run in each set (not according to the invention), all operating conditions were the same except that drawing was at atmospheric pressure in air. For each run, the transparency of the filament was noted visually and the volume fraction of internal voids was measured by a comparative density method (J. B. Smith et al, J. Polym. Sci., Polym. Phys. Ed. 13, 2331 (1975)). The tensile modulus of elasticity (Young's modulus, in GPa) of each filament was measured at room temperature (on an Instron Tester at a cross-head speed of 0.05 cm. per minute, with a sample of gauge length 5.0 cm., observing the tangent of the stress-strain curve corresponding to 0.1 percent strain).

Data observed are given in the accompanying Table. From these results, the transparency, low voids content, and higher modulus achieved by ultra-drawing at extreme applied pressure are clearly seen.

TABLE

| Pressure (Atmospheres) | Temperature °C. | Draw Ratio | Transparency | Voids % | Modulus GPa |
|---|---|---|---|---|---|
| POLYETHYLENE | | | | | |
| Alathon 7030 (duPont) | | | | | |
| 1 | 75 | 30 | opaque | 20 | 30 |
| 1000 | 74 | 21 | translucent | 8 | 21 |
| 1000 | 92 | 25 | transparent | <3 | 42 |
| 1 | 100 | cannot be effectively ultra-drawn - ductile fracture | | | |
| 500 | 100 | 26 | transparent | <3 | 37 |
| 1000 | 100 | 24 | transparent | <3 | 47 |
| XP 5305 (Dow Chemical) | | | | | |
| 1 | 75 | 28 | opaque | 20 | 32 |
| 1 | 100 | cannot be effectively ultra-drawn - ductile fracture | | | |
| 1000 | 100 | 25 | transparent | <3 | 50 |

TABLE-continued

| Pressure (Atmospheres) | Temperature °C. | Draw Ratio | Transparency | Voids % | Modulus GPa |
|---|---|---|---|---|---|
| 1000 | 120 | 30 | transparent | <3 | 55 |
| 1000 | 125 | 31 | transparent | <3 | 48 |
| LP 51.1 (Dow Chemical) | | | | | |
| 1 | 80 | 30 | opaque | 20 | 34 |
| 1 | 100 | cannot be effectively ultra-drawn - ductile fracture | | | |
| 500 | 100 | 25 | transparent | <3 | 48 |
| 1000 | 100 | 24 | transparent | <3 | 50 |
| 500 | 120 | 31 | transparent | <3 | 61 |
| 1000 | 120 | 30 | transparent | <3 | 60 |
| 2000 | 120 | 26 | transparent | <3 | 53 |
| POLYPROPYLENE | | | | | |
| Melt Viscosity 1.87 | | | | | |
| 1 | 175 | cannot be effectively ultra-drawn - ductile fracture | | | |
| 1000 | 175 | 20 | transparent | * | 13 |
| 1000 | 175 | 22 | transparent | * | 15 |
| Melt Viscosity 4.14 | | | | | |
| 1 | 175 | cannot be effectively ultra-drawn - ductile fracture | | | |
| 1000 | 175 | 13 | transparent | * | 8 |
| 1000 | 175 | 18 | transparent | * | 14 |

*Not measured

We claim:

1. A process of making transparent high-modulus polymer filament, rod, or film which comprises ultra-drawing a crystalline organic polymer in the solid state at a temperature within 70° C. of but below its melting point at the operating pressure while subjecting the polymer during and immediately after drawing to a hydrostatic pressure of at least about 500 atmospheres by a medium inert to the polymer, thereby to restrain void formation in the polymer during ultradrawing and render the product transparent.

2. A process according to claim 1 in which the filament, rod, or film is ultra-drawn from a body of isotropic polymer at a draw ratio of at least 20:1.

3. A process according to claim 2 in which the polymer is high-density polyethylene and the temperature is at least 70° C.

4. A process according to claim 2 in which the polymer is isotactic polypropylene and the temperature is at least 100° C.

5. A process according to claim 3 in which the draw ratio is at least 30:1 and the rate of drawing is at least 500 percent per minute.

6. A process according to claim 5 in which the temperature is from about 100° to about 110° C.

7. A process according to claim 5 in which the temperature is from 70° to 80° C. and the pressure is 1500 to 2000 atmospheres.

8. A process according to claim 1 in which the medium is glycerol.

9. A process according to claim 1 in which both the undrawn solid polymer body and the newly drawn product are within a single hydraulic pressure chamber.

10. In a process of making high-modulus polymer filament, rod, or film by subjecting a crystalline organic polymer to ultra-drawing by applying stretching force in the solid state at a temperature within 70° C. of but below its melting point at the operating pressure, under conditions which at atmospheric pressure cause formation of voids in the drawn product and render it opaque, the improvement which comprises applying to the polymer during and immediately after drawing hydrostatic pressure by means of a medium inert to the polymer, such pressure being at least 500 atmospheres and sufficient to restrain void formation and render the product transparent.

* * * * *